(12) United States Patent
Wenger et al.

(10) Patent No.: US 7,882,020 B1
(45) Date of Patent: Feb. 1, 2011

(54) METHOD AND SYSTEM FOR COLLECTION AND ANALYSIS OF SHAREHOLDER INFORMATION

(75) Inventors: David Wenger, Darien, CT (US); Fraser B. Barnes, Sidney (CA); Marc A. Pitcher, New York, NY (US); Robert Drake, Pawling, NY (US)

(73) Assignee: Shareholder Intelligence Services LLC, Rowayton, CT (US)

( * ) Notice: Subject to any disclaimer, the term of this patent is extended or adjusted under 35 U.S.C. 154(b) by 0 days.

(21) Appl. No.: 12/890,205

(22) Filed: Sep. 24, 2010

Related U.S. Application Data (62) Division of application No. 10/867,421, filed on Jun. 14, 2004, now Pat. No. 7,831,500.

(60) Provisional application No. 60/478,503, filed on Jun. 13, 2003.

(51) Int. Cl.
 *G06Q 40/00* (2006.01)
(52) U.S. Cl. .......................................... 705/37; 705/35
(58) Field of Classification Search .............. 705/35–37
 See application file for complete search history.

(56) References Cited

U.S. PATENT DOCUMENTS

| | | | |
|---|---|---|---|
| 5,491,791 A | 2/1996 | Glowny et al. | |
| 6,012,042 A | 1/2000 | Black et al. | |
| 6,317,728 B1 | 11/2001 | Kane | |
| 6,983,266 B1 * | 1/2006 | Goldschmidt | 706/52 |
| 2002/0091622 A1 | 7/2002 | Mastwyk et al. | |
| 2002/0120544 A1 | 8/2002 | Butcher | |
| 2002/0138417 A1 | 9/2002 | Lawrence | |
| 2002/0169774 A1 * | 11/2002 | Greenbaum et al. | 707/9 |
| 2003/0069822 A1 | 4/2003 | Ito et al. | |
| 2003/0088482 A1 | 5/2003 | Blumberg | |
| 2003/0093345 A1 | 5/2003 | Cutbirth | |
| 2004/0193532 A1 | 9/2004 | Lawrence | |
| 2005/0273418 A1 | 12/2005 | Campbell | |

\* cited by examiner

*Primary Examiner*—James A Kramer
*Assistant Examiner*—Hao Fu
(74) *Attorney, Agent, or Firm*—St. Onge Steward Johnston & Reens LLC (57) ABSTRACT

A system and method is provided for the gathering of and manipulation of shareholder data, including information on individual shareholders and related custodians of shares, and comparing the shareholder/custodian data to a set of rules and/or a set of marketing analysis data to identify securities compliance issues and/or evaluate a securities marketing plan.

14 Claims, 8 Drawing Sheets

METHOD AND SYSTEM FOR COLLECTION AND ANALYSIS OF SHAREHOLDER INFORMATION

CROSS-REFERENCE TO RELATED APPLICATIONS

This application is a divisional of U.S. patent application Ser. No. 10/867,421 filed Jun. 14, 2004 now U.S. Pat. No. 7,831,500, which application claims the benefit under 35 U.S.C. §119(e) of the U.S. Provisional Patent Application Ser. No. 60/478,503, filed on Jun. 13, 2003. The content of all prior applications is incorporated herein by reference.

FIELD OF THE INVENTION

The present invention relates to a system and method for gathering and analyzing for certain purposes information or data relating to the ownership and/or custody of publicly traded securities, and more particularly to the gathering, manipulating and analyzing for certain purposes of information or data relating to individual shareholders and/or individual custodians of such securities.

BACKGROUND OF THE INVENTION

Securities (e.g., stocks, bonds, notes, futures, bills, options, etc.) have been sold to the general public for many years. Companies and other entities that offer their securities in this manner are typically known as publicly traded. In recent years, publicly traded companies have increasingly faced litigation with regard to their accounting and business practices and have come under greater scrutiny by regulatory agencies. The regulator, the investor, the issuer and even external auditors have all been affected by this trend.

Various systems have been employed to gather data on publicly traded companies and public securities trades that take place. In fact, forensic accounting is focused in part, on gathering a large amount of historical data relating to such practices. Large amounts of data relating to various securities trades have been gathered and compiled by regulatory agencies, investors and securities issuers for various reasons.

One area of data gathering however that has been largely ignored is the gathering of data relating to the individual shareholder of securities and/or the custodians thereof rather than only for instance, data relating to institutional investors or data relating to the trades themselves. In the litigious environment in which we exist, enforcement actions, civil suits, audits, as well as activities designed to prevent accounting and trading abuses or even outright fraud can be enhanced by looking beyond the numbers and gathering data relating to the shareholders themselves. Abuses such as insider trading and compliance issues may be more effectively monitored employing such information. Still further, securities issuers may be able to assist and/or monitor investor relations firms as well as investment bankers with this type of information.

In addition to assisting the above-listed agencies and/or groups, gathering and manipulating of shareholder and/or custodian data can also provide a significant future marketing tool for the securities issuer, providing detailed information on ownership make-up of the publicly traded company.

It should be noted, however, that the collection and analysis of shareholder data has not been completely ignored. For example, one reference that is directed to the gathering of shareholder data, U.S. Published Patent Application No. 2002/0120544 ("the '544 application") discloses the collection and analysis of certain shareholder data including for instance, geographic location of shareholder, familiar relationships between shareholders, relationships between shareholders and the companies in which they hold shares, the number of shares held, the length of time shares are held by shareholders, etc. This type if information is gathered in order to evaluate the desirability of buying or selling shares in particular companies (i.e., as an investment analysis tool for potential or current investors).

However, the '544 application fails to teach or suggest in any way the collection and analysis of shareholder information or data for custody and compliance purposes, for allowing the publicly traded company to evaluate its shareholders and market makers so as to, for example, better target potential future shareholders, for forensic accounting purposes, or for the plethora of other purposes that may be useful to parties other than simply potential or current investors. The '544 application also fails to teach or suggest gathering information or data on individual shareholders or share custodians of a publicly traded company at different points in time, comparing the information or data from different point in time, and providing analysis of changes based on the comparison.

Accordingly, what is desired then is a system and method that gathers and manipulates shareholder and/or custodial information or data, and which, based upon the information or data, checks for compliance issues, which gathers information or data relating to an individual shareholder for checking compliance issues, which gathers information or data relating to an individual shareholder for processing into a form that is useful to the processor, which gathers and manipulates information or data relating to an individual shareholder for future marketing of shares, which gathers information or data relating to an individual shareholder for assisting and/or monitoring the performance of investor relations firms and/or investment bankers, among other entities, and which gathers information concerning the custodians of shareholders' shares in each of the afore-mentioned instances.

SUMMARY OF THE INVENTION

Accordingly, it is an object of the present invention to provide a system and method that gathers and manipulates shareholder information or data which, based upon the information or data, checks for compliance issues.

Another object of the present invention is to provide a system and method that gathers and manipulates shareholder information or data having the above characteristics and which gathers information or data relating to an individual shareholder for checking compliance issues.

A further object of the present invention is to provide a system and method that gathers and manipulates shareholder information or data having the above characteristics and which gathers information or data relating to an individual shareholder and/or the custodian of his/her shares for processing into a form that is useful to the system.

Still another object of the present invention is to provide a system and method that gathers and manipulates shareholder information or data having the above characteristics and which gathers and manipulates information or data relating to an individual shareholder for future marketing of shares.

Yet a further object of the present invention is to provide a system and method that gathers and manipulates shareholder information or data having the above characteristics and which gathers information or data relating to an individual shareholder for assisting and/or monitoring the performance of investor relations firms and/or investment bankers, among other entities.

These and other objects of the present invention are achieved in one embodiment by provision of a system for automatically identifying securities compliance issues. The system includes a processor having a communications connection for receiving shareholder data concerning shareholders of securities, and a storage device accessible by the processor, the storage device having stored thereon a set of rules. The processor manipulates the received shareholder data into processed shareholder data, and compares the processed shareholder data against the set of rules in order to evaluate whether the processed shareholder data complies with the set of rules.

In some embodiments, the set of rules comprises at least one of a law, a regulation, and an administrative rule. In some embodiments, the set of rules comprises at least one rule relating to at least one of insider trading and naked short-selling. In some embodiments, the set of rules comprises at least one rule relating to at least one of prohibited collusion, unfair trade practices, and the prevention of the formation of unlawful monopolies. In some embodiments, the set of rules comprises at least one rule relating to the sale of securities to persons living in states in which the securities are not registered for sale.

In some embodiments, the shareholder data comprises data indicative of at least one of share ownership, share owner location, and a share certificate custodian. In some embodiments, the shareholder data comprises data indicative of whether the shareholder is at least one of an individual, a trust, an institution and a share issuer. In certain of these embodiments, the shareholder data comprises data indicative of at least one of a name, address, telephone number, and e-mail address of the shareholder. In certain embodiments, the shareholder data comprises data indicative of whether an individual shareholder is an employee or is related to an employee of a company in which the individual shareholder is a shareholder. In some embodiments, the shareholder data comprises data indicative of a number of shares involved in a transfer.

In accordance with another embodiment of the present invention, a system for automatically identifying securities compliance issues includes a processor having a communications connection for receiving shareholder data concerning shareholders of securities periodically or from time to time, and a storage device accessible by the processor, the storage device having stored thereon a set of rules. The processor compares shareholder data received at a first time with shareholder data received at a second time to create comparison data, and compares the comparison data against the set of rules in order to evaluate whether securities compliance issues exist.

In some embodiments, the set of rules comprises at least one of a law, a regulation, and an administrative rule. In some embodiments, the set of rules comprises at least one rule relating to at least one of insider trading and naked short-selling. In some embodiments, the set of rules comprises at least one rule relating to at least one of prohibited collusion, unfair trade practices, and the prevention of the formation of unlawful monopolies. In some embodiments, the set of rules comprises at least one rule relating to the sale of securities persons living in states in which the securities are not registered for sale.

In accordance with a further embodiment of the present invention, a system for automatically creating or evaluating a securities marketing plan includes a processor having a communications connection for receiving shareholder data concerning shareholders of securities, and a storage device accessible by the processor, the storage device having stored thereon a set of marketing analysis data. The processor manipulates the received shareholder data into processed shareholder data, and compares the processed shareholder data against the set of marketing analysis data in order to automatically create a new securities marketing plan or evaluate an existing securities marketing plan.

In some embodiments, the processor automatically evaluates an existing securities marketing plan, and the system further comprises a storage device accessible by the processor, the storage device having stored thereon data indicative of the existing securities marketing plan. In some embodiments, the processor automatically evaluates performance of at least one party involved with the current marketing plan. In certain of these embodiments, the at least one party comprises at least one of an investment banker and an investor relations firm. In some embodiments, the shareholder data comprises data indicative of a shareholder type, and the processor automatically creates a new marketing plan based at least in part on a distribution of share ownership among shareholder types. In some embodiments, the shareholder data comprises data indicative of shareholder geographic location, and the processor automatically creates a new marketing plan based at least in part on a geographic distribution of share ownership.

In accordance with still a further embodiment of the present invention, a system for automatically creating or evaluating a securities marketing plan includes a processor having a communications connection for receiving shareholder data concerning shareholders of securities periodically or from time to time, and a storage device accessible by the processor, the storage device having stored thereon a set of marketing analysis data. The processor compares shareholder data received at a first time with shareholder data received at a second time to create comparison data, and compares the comparison data against the set of marketing analysis data in order to automatically create a new securities marketing plan or evaluate an existing securities marketing plan.

In accordance with another aspect of the present invention, a method for automatically identifying securities compliance issues comprises the steps of: receiving shareholder data concerning shareholders of securities via a communications connection; retrieving a set of rules from a storage device; automatically manipulating the received shareholder data into processed shareholder data; and automatically comparing the processed shareholder data against the set of rules in order to evaluate whether the processed shareholder data complies with the set of rules.

In some embodiments, the set of rules comprises at least one of a law, a regulation, and an administrative rule. In some embodiments, the set of rules comprises at least one rule relating to at least one of insider trading and naked short-selling. In some embodiments, the set of rules comprises at least one rule relating to at least one of prohibited collusion, unfair trade practices, and the prevention of the formation of unlawful monopolies. In some embodiments, the set of rules comprises at least one rule relating to the sale of securities to persons living in states in which the securities are not registered for sale.

In some embodiments, the shareholder data comprises data indicative of at least one of share ownership, share owner location, and a share certificate custodian. In some embodiments, the shareholder data comprises data indicative of whether the shareholder is at least one of an individual, a trust, an institution and a share issuer. In certain of these embodiments, the shareholder data comprises data indicative of at least one of a name, address, telephone number, and e-mail address of the shareholder. In certain embodiments, the shareholder data comprises data indicative of whether an individual shareholder is an employee or is related to an employee of a company in which the individual shareholder is a shareholder. In some embodiments, the shareholder data comprises data indicative of a number of shares involved in a transfer.

In accordance with a further embodiment of the invention, a method for automatically identifying securities compliance issues comprises the steps of: receiving, at a first time, shareholder data concerning shareholders of securities via a communications connection; receiving, at a second time, shareholder data concerning shareholders of securities via a communications connection; retrieving a set of rules from a storage device; automatically comparing the shareholder data received at the first time with the shareholder data received at the second time to create comparison data; and automatically comparing the comparison data against the set of rules in order to evaluate whether securities compliance issues exist.

In some embodiments, the set of rules comprises at least one of a law, a regulation, and an administrative rule. In some embodiments, the set of rules comprises at least one rule relating to at least one of insider trading and naked short-selling. In some embodiments, the set of rules comprises at least one rule relating to at least one of prohibited collusion, unfair trade practices, and the prevention of the formation of unlawful monopolies. In some embodiments, the set of rules comprises at least one rule relating to the sale of securities to persons living in states in which the securities are not registered for sale.

In accordance with still a further embodiment of the present invention, a method for automatically creating or evaluating a securities marketing plan comprises the steps of: receiving shareholder data concerning shareholders of securities via a communications connection; retrieving a set of marketing analysis data from a storage device; automatically manipulating the received shareholder data into processed shareholder data; and automatically comparing the processed shareholder data against the set of marketing analysis data in order to create a new securities marketing plan or evaluate an existing securities marketing plan.

In some embodiments, the method automatically evaluates an existing securities marketing plan, and further comprises the step of retrieving data indicative of the existing securities marketing plan from a storage device. In some embodiments, the automatically comparing step comprises the step of evaluating performance of at least one party involved with the current marketing plan. In certain of these embodiments, the at least one party comprises at least one of an investment banker and an investor relations firm.

In some embodiments, the shareholder data comprises data indicative of a shareholder type, and the automatically comparing step comprises the step of automatically creating a new marketing plan based at least in part on a distribution of share ownership among shareholder types. In some embodiments, the shareholder data comprises data indicative of shareholder geographic location, and the automatically comparing step comprises the step of automatically creating a new marketing plan based at least in part on a geographic distribution of share ownership.

In accordance with still another embodiment of the present invention, a method for automatically creating or evaluating a securities marketing plan comprises the steps of: receiving, at a first time, shareholder data concerning shareholders of securities via a communications connection; receiving, at a second time, shareholder data concerning shareholders of securities via a communications connection; retrieving a set of marketing analysis data from a storage device; automatically comparing shareholder data received at the first time with shareholder data received at the second time to create comparison data; and automatically comparing the comparison data against the set of marketing analysis data in order to automatically create a new securities marketing plan or evaluate an existing securities marketing plan.

In accordance with yet a further embodiment of the present invention, a system for automatically calculating shareholder cost basis data includes a processor having a communications connection for receiving shareholder data concerning shareholders of securities, the shareholder data including data indicative of a time of share purchase, and a storage device accessible by the processor, the storage device having stored thereon share price data indicative of share price over time. The processor retrieves share price data from the storage device based at least in part upon the data indicative of a time of share purchase contained in the shareholder data, and then generates cost basis data based at least in part upon the shareholder data and the share price data.

In some embodiments, the share price data is indicative of share price on a per day basis. In some embodiments, the share price data is indicative of share price on an intraday basis. In certain embodiments, the processor further generates a buy-out offering price estimate based at least in part upon the cost basis data. In some embodiments, the processor further generates a shareholder cost basis report.

In accordance with still another embodiment of the present invention, a method for automatically calculating shareholder cost basis data includes the steps of: receiving shareholder data concerning shareholders of securities, the shareholder data including data indicative of a time of share purchase; retrieving share price data indicative of share price over time from a storage device based at least in part upon the data indicative of a time of share purchase contained in the shareholder data; and generating cost basis data based at least in part upon the shareholder data and the share price data.

In some embodiments, the share price data is indicative of share price on a per day basis. In some embodiments, the share price data is indicative of share price on an intraday basis. In certain embodiments, the method further comprises the step of generating a buy-out offering price estimate based at least in part upon the cost basis data. In some embodiments, the method further comprises the step of generating a shareholder cost basis report.

Other objects of the invention and its particular features and advantages will become more apparent from consideration of the following drawings and accompanying detailed description.

DETAILED DESCRIPTION OF THE INVENTION

It should be understood that for the sake of simplicity, the term "shareholder" as used herein is intended to mean shareholders and/or custodians of shares. Similarly, when the term "shareholder data" is used, it should be understood that what is meant is data relating to the shareholders and/or custodians of shares.

Referring now to the figures, wherein like reference numerals designate corresponding structure throughout the views.

As previously stated, a system and method is desired for the gathering of shareholder data for determination of compliance issues. The '544 application only discloses the collection and analysis of certain shareholder data in order to evaluate the desirability of acquiring shares in particular companies, but fails to teach determining if the shareholder data raises any compliance issues, or generating/evaluating a securities marketing plan.

Figure 1:
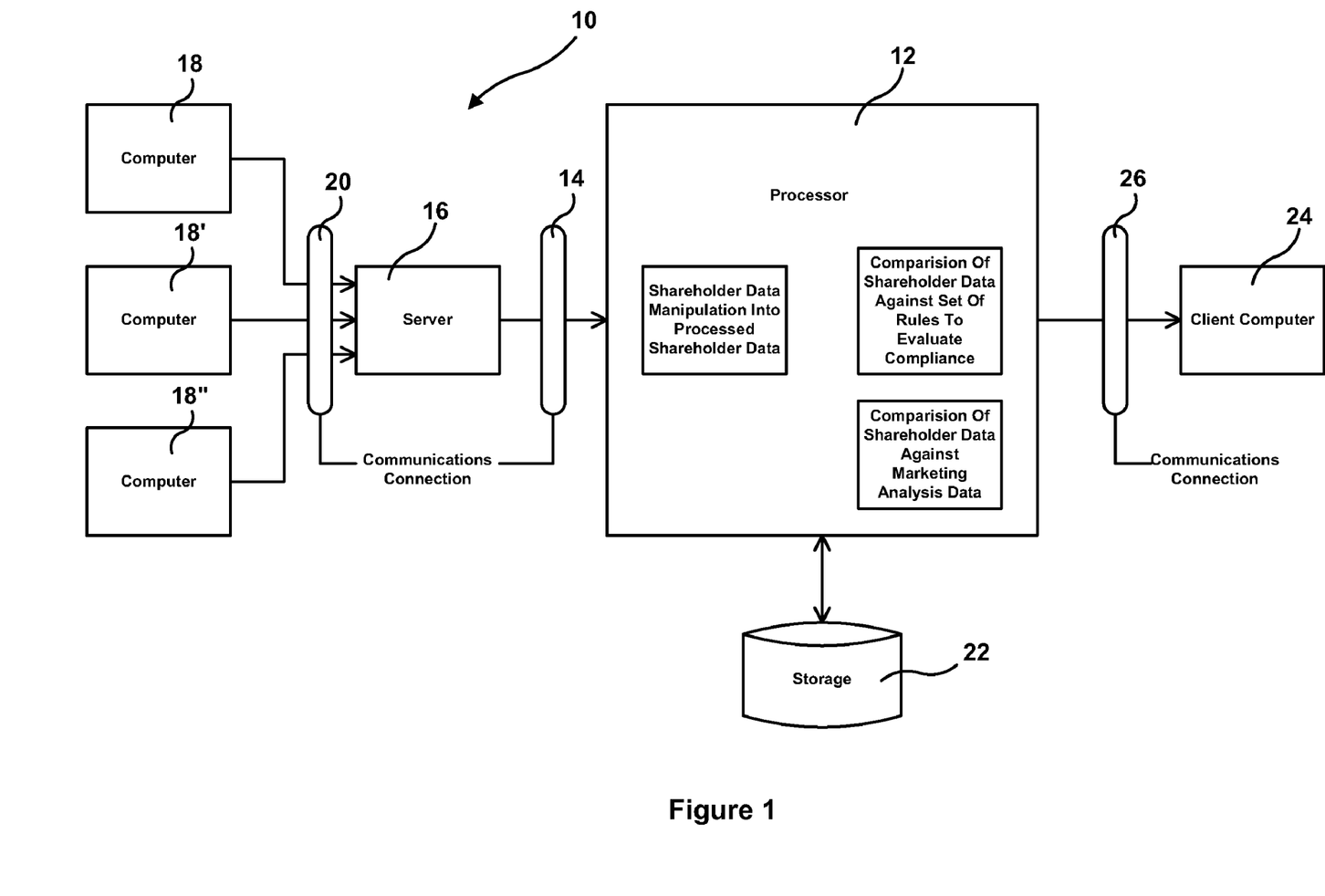
FIG. 1 is a block diagram schematically illustrating operation of one advantageous embodiment of a system and method in accordance with the present invention.

FIG. 1 illustrates one advantageous embodiment of system 10 for the gathering of, manipulation of, and determination of whether the gathered shareholder data complies with a set of rules. In this advantageous embodiment, system 10 includes a processor 12 for processing of the shareholder data. Processor 12 is provided with a network connection 14 for connecting to a server 16 in order to access shareholder data.

It is contemplated that network connection 14 joining the processor 12 and server 16 may be or include any one or more of, for instance, the Internet, an intranet, a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ATM (Asynchronous Transfer Mode) connection, FDDI (Fiber Distributed Data Interface) or CDDI (Copper Distributed Data Interface) connections.

Server 16 in turn is variously connected to computers 18, 18', 18" which may comprise for instance personal computers or other servers. In addition, while three computers 18, 18', 18" are illustrated it is contemplated that any number may be variously connected to server 16. Computers 18, 18', 18" are one source for the acquisition of shareholder data and may include for instance, but is not limited to, a computer for an individual, a trust, an institution, a share issuer, a registrar, a transfer agent, an investor relations firm, an investment banker, the Depository Trust Company (DTC), Automatic Data Processing (ADP), Cede& Co., etc., to name a few. These may simply be some of the sources from which shareholder data may variously be obtained.

Network link 20 may comprise or include any of the systems as described in connection with network link 14 above. In addition, network link 20 may furthermore be or include a Personal Area Network (PAN), a Family Area Network (FAN), a cable modem connection, an analog modem connection such as a V.90 or other protocol connection, an Integrated Service Digital Network (ISDN) or Digital Subscriber Line (DSL) connection, a BlueTooth wireless link, a WAP (Wireless Application Protocol) link, a Symbian® link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, an IEEE 802.11-based radio frequency link, or other wired or wireless links.

In addition, computers 18, 18', 18" as well as server 16 may be or include, for instance, a personal computer running the Microsoft Windows® 95, 98, 2000, Millenium®, NT®, XP, Windows CE®, Palm® OS, Unix®, Linux®, Solaris®, OS/2®, BeOS®, MacOS® or other operating system or platform. Computers 18, 18', 18" as well as server 16 may also be or include any microprocessor-based machine such as an Intel® x86-based device or Motorola 68K or PowerPC device, microcontroller or other general or special purpose device operating under programmed control.

The various shareholder data gathered by processor 12 may include for instance, details of: share ownership, share owner location, and the share certificate custodian. Shareholder data may include the category of the shareholder (e.g. whether an individual, trust, institution or share issuer). Shareholder data may include identification of the custodian of the shares (e.g. whether an individual, a registrar/transfer agent, or the Depository Trust Company/ADP-ICS).

If the shareholder is an individual, the shareholder data may include the shareholder's name, address, telephone number, and e-mail address, and may further be identified as for instance a seller or a buyer over a proscribed period of time, by the number of shares involved in a transaction(s), or by custodial groups.

As stated previously, the gathering of this type of shareholder data may be helpful for regulatory agencies (e.g. Federal and State authorities) and stock issuers in determining compliance issues and/or determining if improper or illegal transactions (e.g. insider trading, naked short selling, etc.) are taking place. This type of shareholder information may further be helpful to or desired by purchasers.

While processor 12 is illustrated as gathering shareholder data from or through server 16, it is contemplated that processor 12 may gather shareholder data from many varying sources including directly from computers 18, 18', 18".

Processor 12 processes or manipulates the gathered shareholder data into a desired or usable data format for comparison with a rule to determine compliance with the standard. It is contemplated that the rule may include for instance a law, a regulation, a rule and/or historical information.

The following are some examples of compliance determinations that may be made by processor 12 in determining whether the shareholder data complies with a rule. For instance, it is contemplated that the comparison for compliance with the standard may include a determination of ownership of stock at a point in time or changes in ownership of stock between points in time to determine for instance, if the stock is being naked short sold at the point in time and/or between the points in time. Further, the compliance determination may include identifying buying and selling activity of an unusual nature when compared with historical buying and selling activity as to for instance, the category of: the shareholder, geographic location, the market maker, or share custodian. In addition, the compliance determination may further include an identification of shareholders who may be employees of or related to employees of the issuing corporation to monitor insider trading and compliance with regulatory reporting. Still further, the compliance determination may still further include monitoring of market makers as measured by selling and buying over proscribed periods.

Processor 12 may in addition to, or instead of, verifying compliance with the various rules, perform evaluate a securities marketing plan by manipulating the received shareholder data into processed shareholder data, and comparing the processed shareholder data against a set of marketing analysis data (preferably retrieved from storage 22) in order to automatically create a new securities marketing plan or evaluate an existing securities marketing plan.

System 10 is further illustrated in FIG. 1 as including storage 22, which may comprise in one advantageous embodiment a storage of information relating to for instance a standard and/or various shareholder data.

Processor 12 is also connected to client computer 24 via network connection 26. It is contemplated that network connection 26 may be or comprise any connection as described in connection with network connection 20. In addition, client computer 24 may also be or comprise any type of computer or platform such as is described for instance in connection with computers 18, 18', 18".

Once a determination is made as to whether the gathered shareholder data complies with a rule, processor 12 may further generate a report based upon the determination. This report may be saved on storage 22 to be later pulled by client computer 24 or may be pushed to client computer 24 when completed or according to a schedule. In any event, the determination of compliance may be accessed by client computer 24.

The compliance evaluation and securities marketing plan routines are shown in more detail in FIGS. 2-5B.

Figure 2:
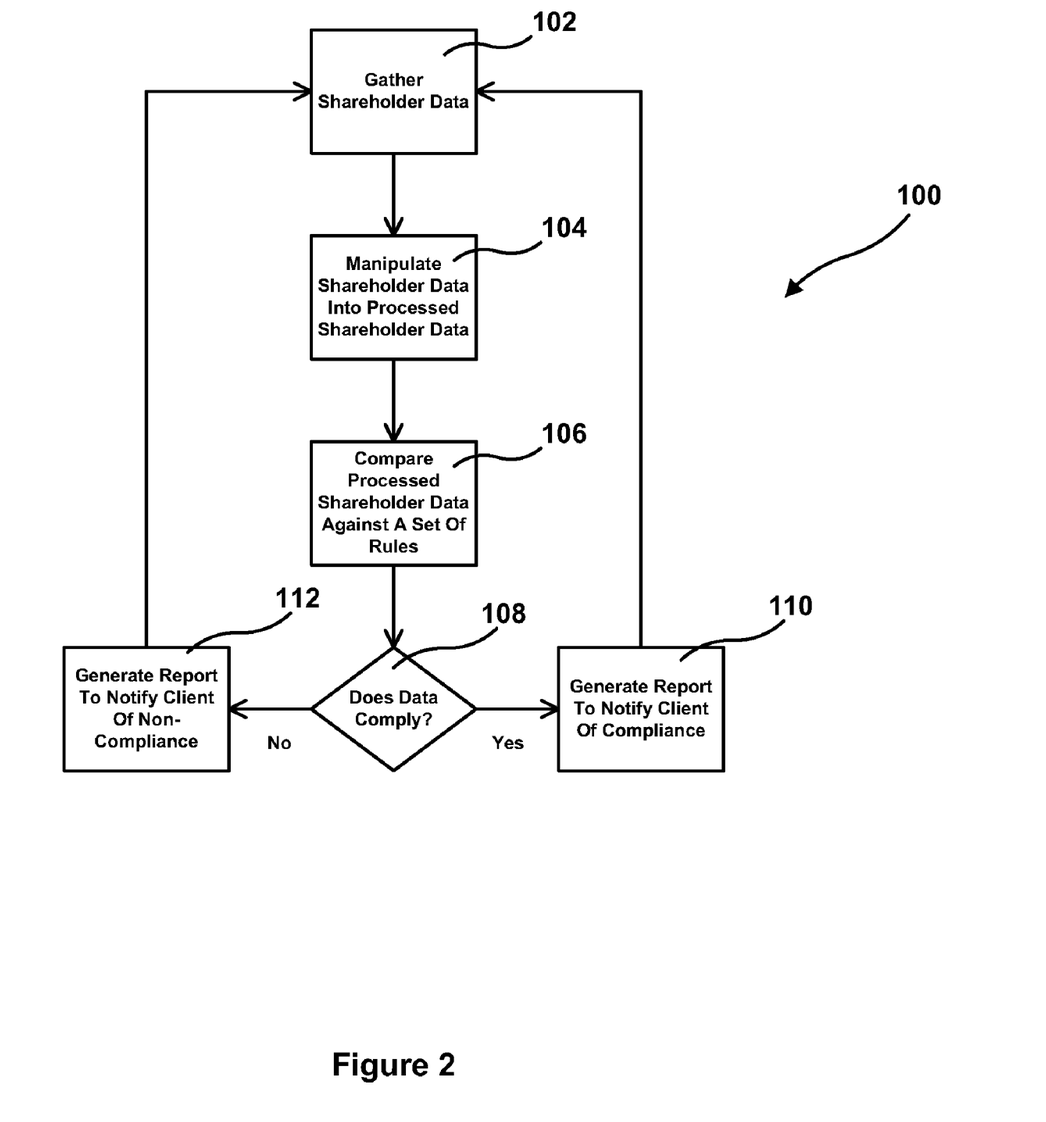
FIG. 2 is a flow diagram illustrating operation of a compliance evaluation routine of the embodiment of the present invention shown in FIG. 1.

FIG. 2 is a flow diagram illustrating operation of a compliance evaluation routine 100 of system 10. Initially, routine 100 receives shareholder data as shown at block 102. The shareholder data may comprise for instance, any of the data as described in connection with FIG. 1. Method 100 further includes the step of manipulating the shareholder data into processed shareholder data, as shown at block 104. Again, the format of the processed data may comprise any format desired and/or useable for determining compliance.

The next step, illustrated at block 106, is to compare the processed shareholder data against the set of rules, which may comprise for instance, a law, a regulation, a rule and/or historical information as described in connection with FIG. 1. Once the shareholder data is compared to the set of rules (at block 106), a determination is made at 108 as to whether the shareholder data complies with the set of rules. It should be noted that this determination of compliance may include but is not limited to any of the previously described or above-listed compliance determinations per FIG. 1. If the shareholder data complies with the set of rules, in one advantageous embodiment a report or notification of such may be generated to notify the client of compliance, as shown at block 110. If the shareholder data does not comply with the set of rules, in another advantageous embodiment a report or notification of such may be generated to notify the client of non-compliance 112.

Figure 3:
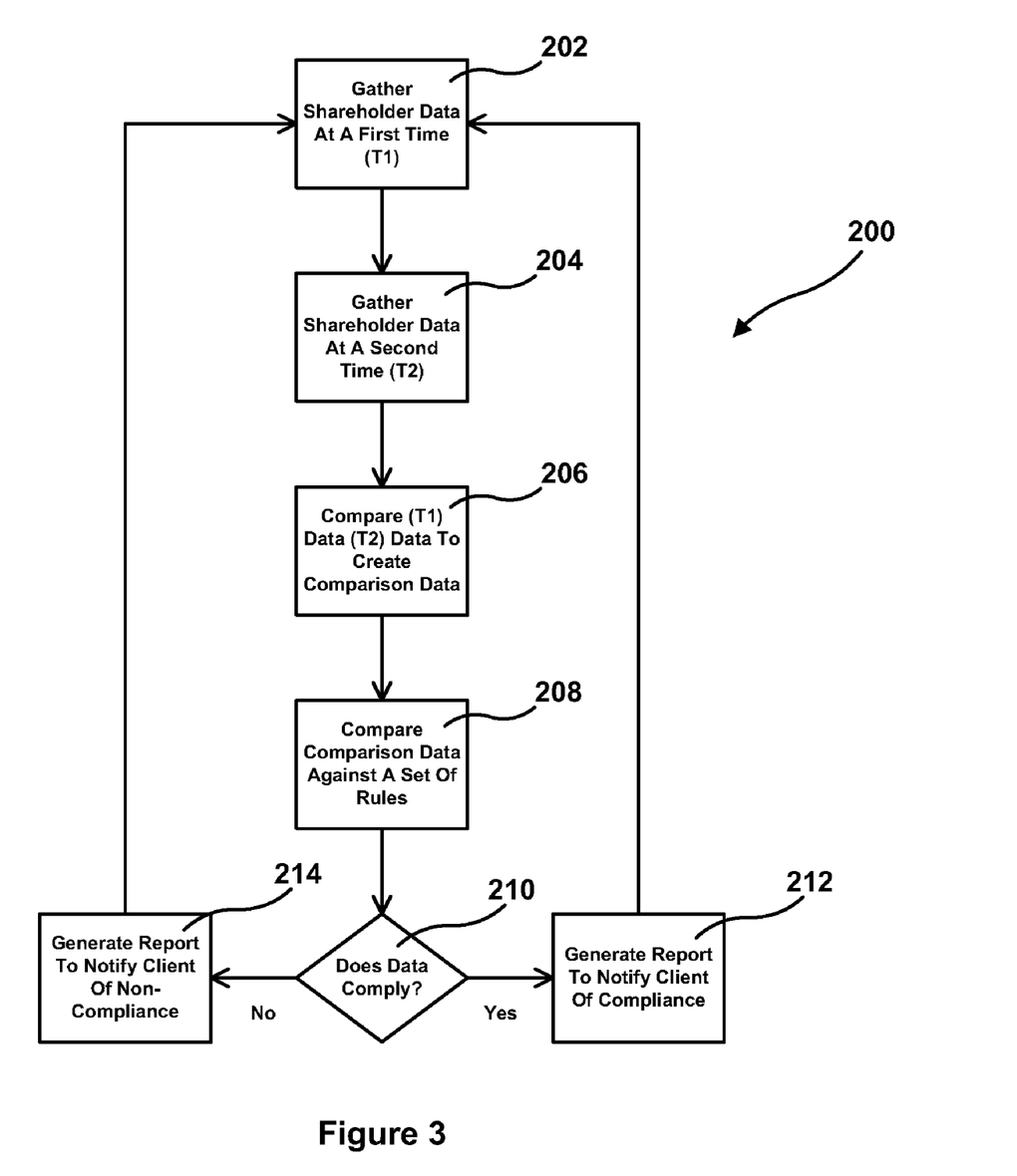
FIG. 3 is a flow diagram illustrating operation of another compliance evaluation routine of the embodiment of the present invention shown in FIG. 1.

Referring now to FIG. 3, operation of an alternative compliance evaluation routine 200 of system 10 is shown. In accordance with this embodiment, routine 200 gathers shareholder data at a first time (T1) and at a second time (T2), as shown at blocks 202 and 204 respectively. The shareholder data may comprise for instance, any of the data as described in connection with FIG. 1. Method 200 further includes the step of comparing, at block 206, the T1 data with the T2 data so as to create comparison data. As above, the format of the comparison data may comprise any format desired and/or useable for determining compliance. The next step, illustrated at block 208, is to compare the comparison data against the set of rules, which may comprise for instance, a law, a regulation, a rule and/or historical information as described in connection with FIG. 1.

The remainder of method 200 is similar to method 100 described above with reference to FIG. 2. More specifically, once the shareholder data is compared to the set of rules (at block 208), a determination is made at 210 as to whether the shareholder data complies with the set of rules. Again, this determination of compliance may include but is not limited to any of the previously described or above-listed compliance determinations per FIG. 1. If the shareholder data complies with the set of rules, in one advantageous embodiment a report may be generated to notify the client of compliance, as shown at block 212. If the shareholder data does not comply with the set of rules, in another advantageous embodiment a report may be generated to notify the client of non-compliance 214.

The determination of compliance or non-compliance of the shareholder data with the set of rules will provide, for instance, the regulator and/or the issuer with valuable information for determining compliance with laws and regulations to prevent abuses and outright fraud. This evaluation may also highlight or pick up unusual trading activity when compared to for instance, historical trading data. In any event, the additional information may provide valuable insight into the trading activities monitored whether a single set of shareholder data is analyzed or multiple sets in time are analyzed as described above.

Figure 4A:
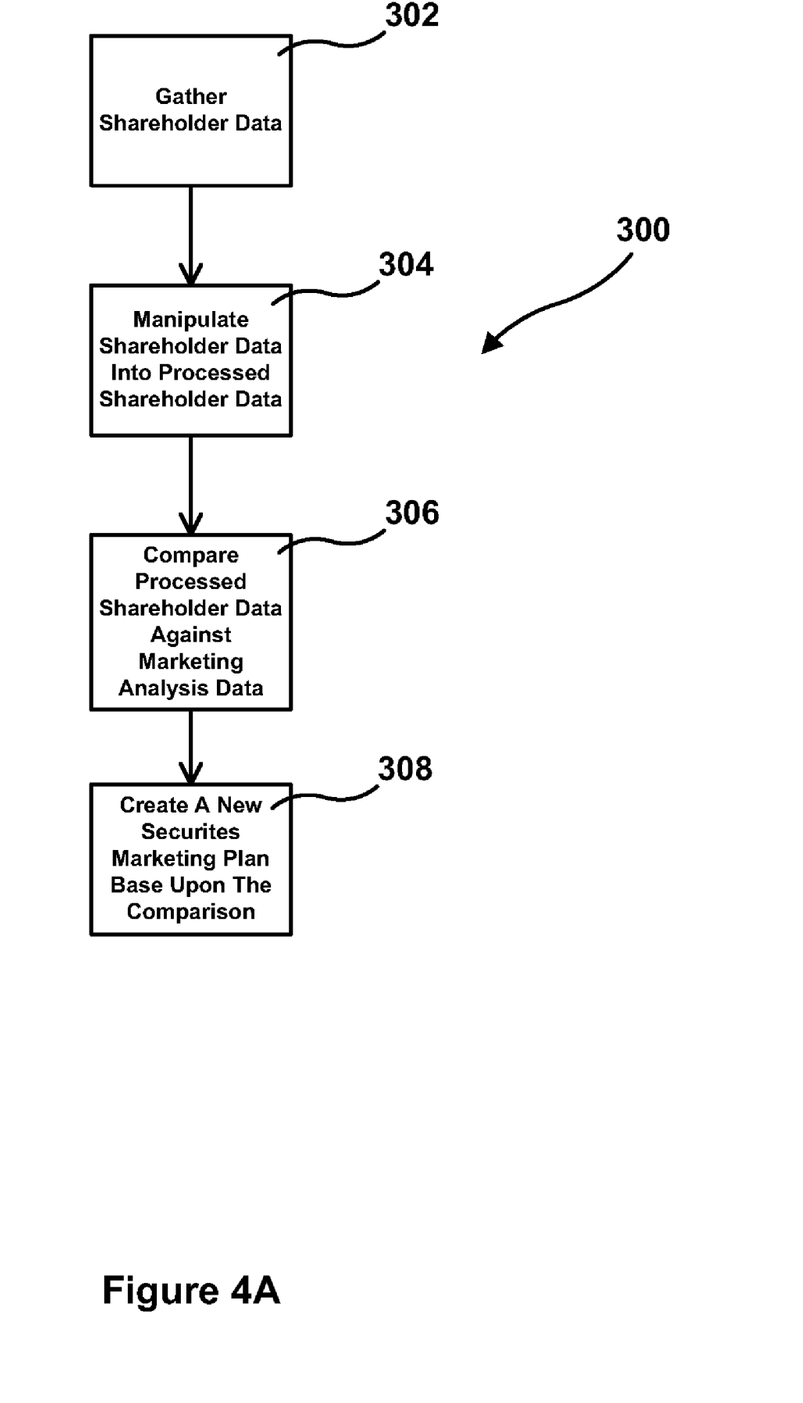
FIG. 4A is a flow diagram illustrating operation of a first securities marketing plan creation routine of the embodiment of the present invention shown in FIG. 1.
Figure 4B:
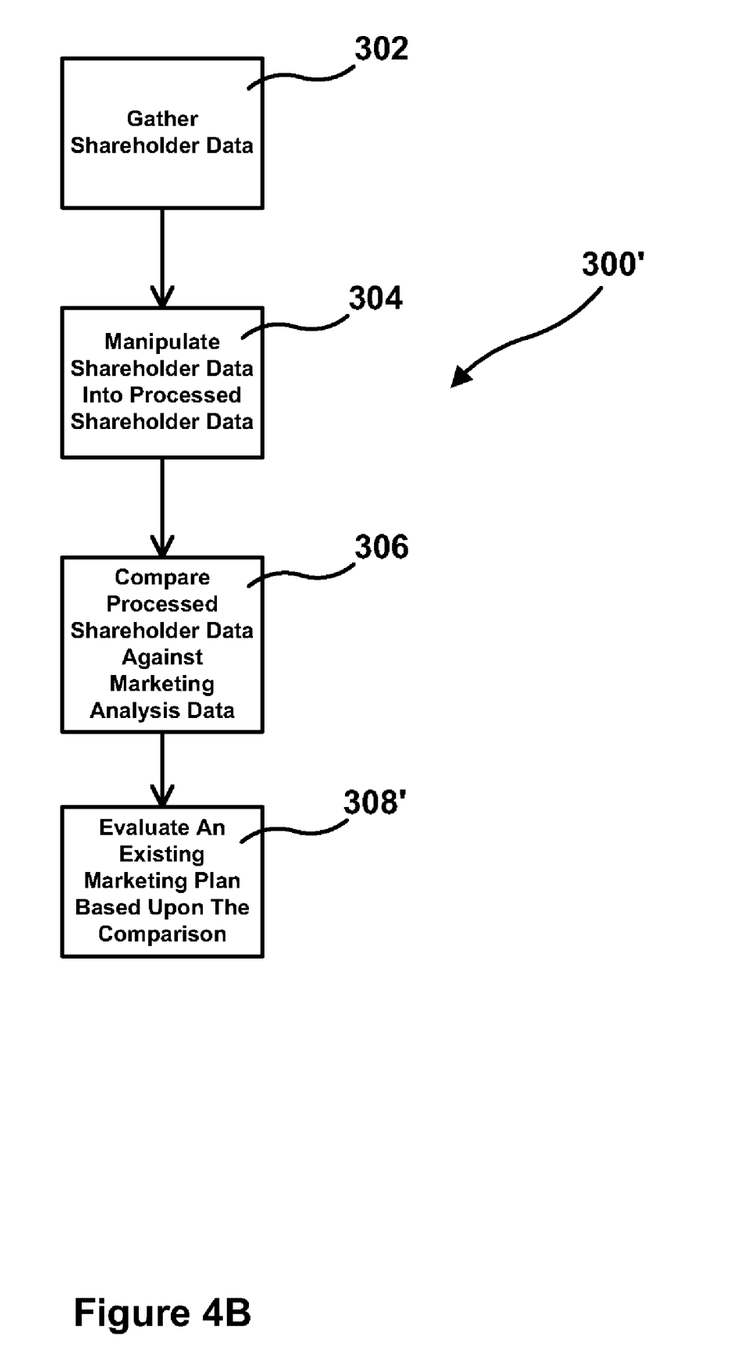
FIG. 4B is a flow diagram illustrating operation of a first securities marketing plan evaluation routine of the embodiment of the present invention shown in FIG. 1.

FIGS. 4A and 4B are flow diagrams illustrating operation of a routine 300, 300' of system 10 for automatically creating or evaluating a securities marketing plan. As with above, the initial step (shown at 302) is to gather shareholder data concerning shareholders of securities. At 304, this data is manipulated into processed shareholder data having a useable format. Next, at block 306, this processed shareholder data is compared against marketing analysis data retrieved from a storage device. Finally, based upon the results of the comparison at block 306, a new securities marketing plan is created at block 308 (FIG. 4A), or an existing securities marketing plan is evaluated at block 308' (FIG. 4B). In the latter case, data indicative of the existing securities marketing plan is preferably retrieved from a storage device (which may in one advantageous embodiment comprise a database) for evaluation at block 308'.

Figure 5A:
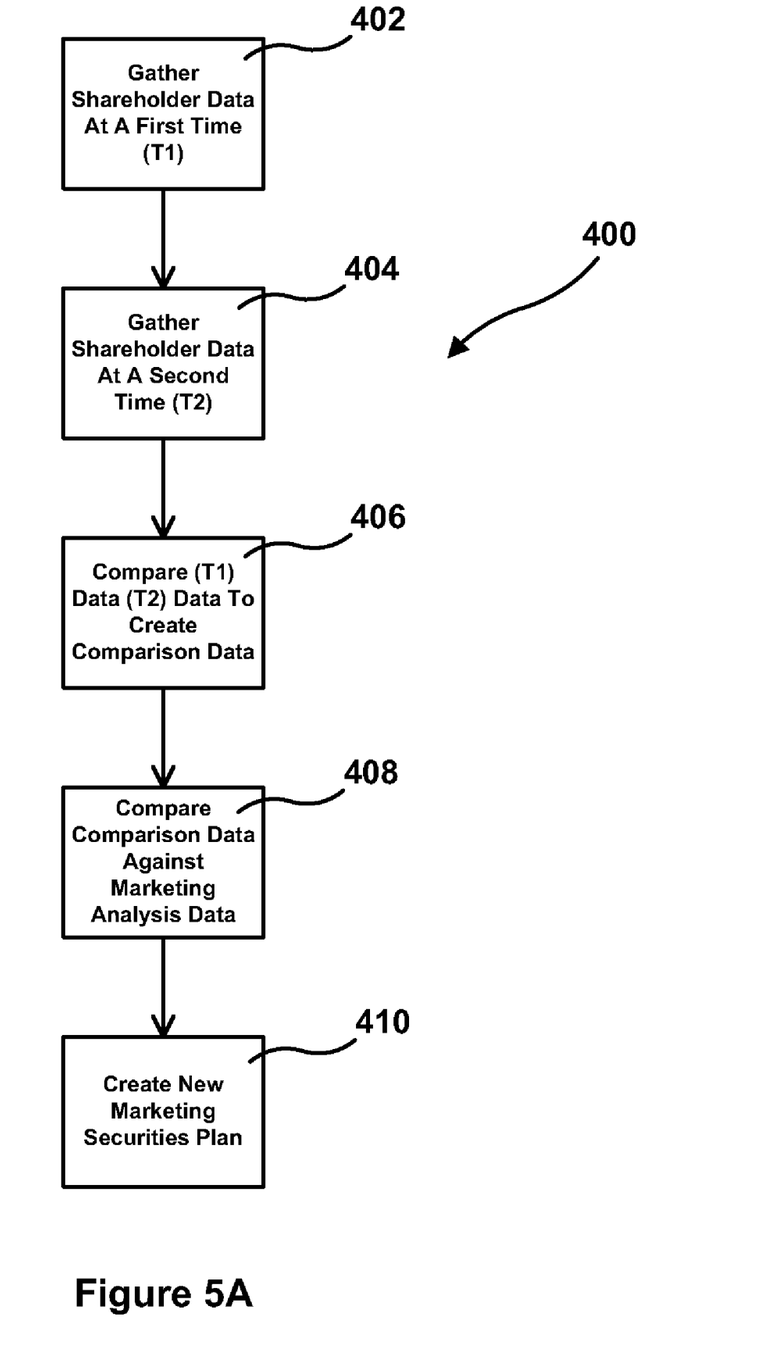
FIG. 5A is a flow diagram illustrating operation of a second securities marketing plan creation routine of the embodiment of the present invention shown in FIG. 1.
Figure 5B:
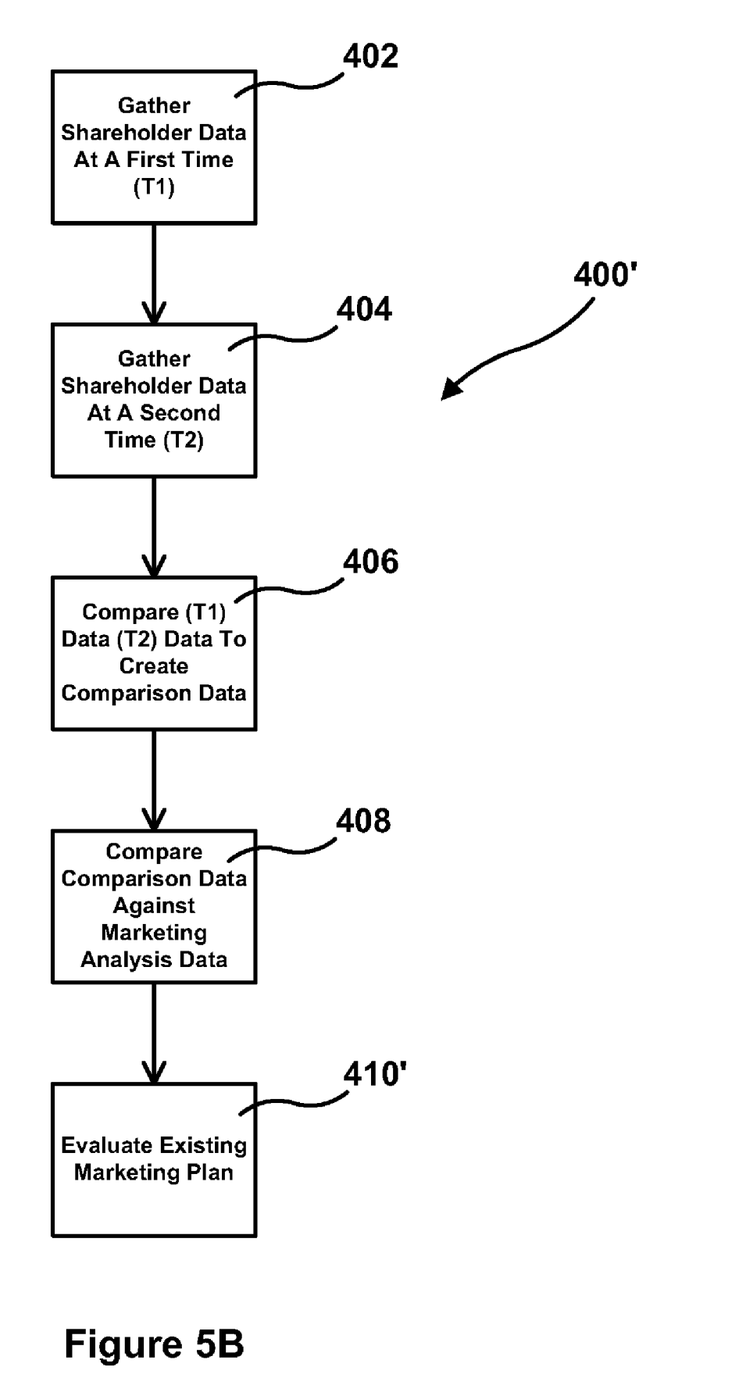
FIG. 5B is a flow diagram illustrating operation of a second securities marketing plan evaluation routine of the embodiment of the present invention shown in FIG. 1.

Referring now to FIGS. 5A and 5B, flow diagrams illustrating operation of an alternate routine 400, 400' of system 10 for automatically creating or evaluating a securities marketing plan is shown. In accordance with this embodiment, routine 400, 400' gathers shareholder data at a first time (T1) and at a second time (T2), as shown at blocks 402 and 404 respectively. The shareholder data may comprise for instance, any of the data as described in connection with FIG. 1. Method 400, 400' further includes the step of comparing, at block 406, the T1 data with the T2 data to create comparison data. As above, the format of the comparison data may comprise any format desired and/or useable for determining compliance. The next step, illustrated at block 408, is to compare the comparison data against marketing analysis data retrieved from a storage device. Finally, based upon the results of the comparison at block 408, a new securities marketing plan is created at block 410 (FIG. 5A), or an existing securities marketing plan is evaluated at block 410' (FIG. 5B). In the latter case, data indicative of the existing securities marketing plan is preferably retrieved from a storage device for evaluation at block 410'.

It is contemplated that various clients such as for instance, investor relations firms, may be able to evaluate and/or improve their performance with respect to a current marketing plan or generate a new marketing plan based upon the gathered and evaluated data.

The present invention may further be applicable to automatically calculate shareholder cost basis data, which may be useful for example, by investment bankers with respect to so-called Pressure Reports.

For instance, investment bankers are responsible in merger and acquisition assignments to determine a recommended buy-out offering price that is high enough to entice shareholders to sell but is not so high that substantially more per share is paid than is necessary for a successful buy-out. The recommended buy-out offering price is determined by assessing what offering price will entice existing shareholders to sell based in part on an analysis of shareholder cost basis. The term Pressure Report as used in this application is used to describe a report generated by investment bankers which is typically based on a guesstimate of shareholder cost basis.

Shareholder data gathered and processed according to the present invention may be used in place of or add meaningful value to Pressure Reports to more accurately determine true or closer to true, i.e. better than the current guesstimate, shareholder cost basis.

Figure 6:
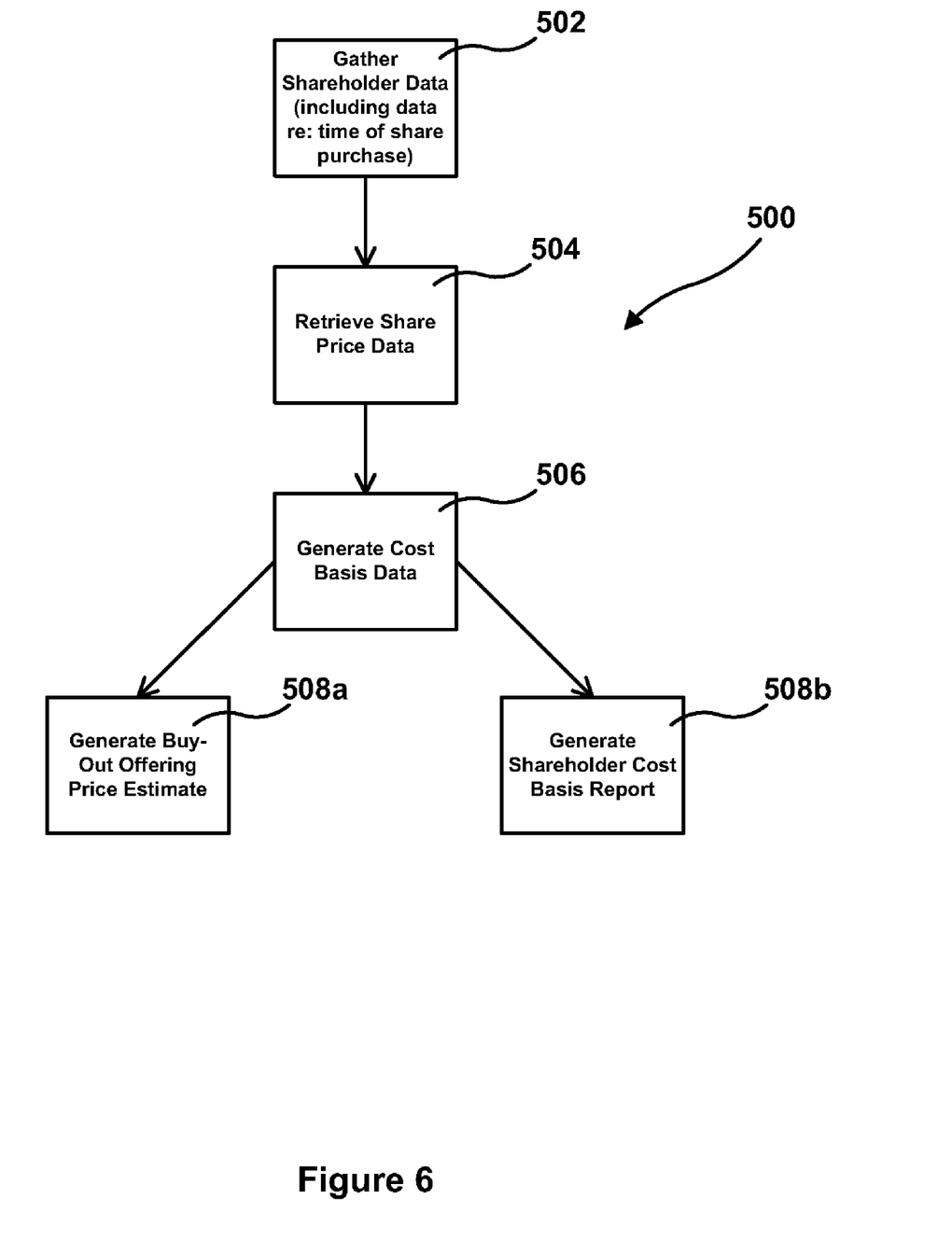
FIG. 6 is a flow diagram illustrating operation of a shareholder cost basis data calculation routine of the embodiment of the present invention shown in FIG. 1.

In one embodiment such a method 500 as is illustrated in FIG. 6 is provided for automatically calculating shareholder cost basis data.

First, shareholder data concerning shareholders of securities is received at 502. The shareholder data includes data indicative of a time of share purchase. Next at 504 share price data indicative of share price over time is retrieved from a storage device based at least in part upon the data indicative of a time of share purchase contained in the shareholder data. The share price information may comprise data indicative of a share price on a per day basis, or more preferably of a share price on an intraday basis. Next at 506 cost basis data is generated based at least in part upon the shareholder data and the share price data.

This cost basis data may be used for various purposes, such as generating a buy-out offering price estimate (as shown at 508*a*), generating a shareholder cost basis report (as shown at 508*b*), or for other purposes.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

The present invention therefore provides a system and method that gathers and manipulates shareholder and/or custodial information or data, and which, based upon the information or data, checks for compliance issues, which gathers information or data relating to an individual shareholder for checking compliance issues, which gathers information or data relating to an individual shareholder for processing into a form that is useful to the processor, which gathers and manipulates information or data relating to an individual shareholder for future marketing of shares, which gathers information or data relating to an individual shareholder for assisting and/or monitoring the performance of investor relations firms and/or investment bankers, among other entities, and which gathers information concerning the custodians of shareholders' shares in each of the afore-mentioned instances.

Although the invention has been described with reference to particular ingredients and formulations and the like, these are not intended to exhaust all possible arrangements or features, and indeed many other modifications and variations will be ascertainable to those of skill in the art.

What is claimed is:

1. A system for automatically creating or evaluating a securities marketing plan, said system comprising:
    a processor having a communications connection configured to receive at a first time, first shareholder data concerning shareholders of securities, said first shareholder data consisting of historic data relating to securities and historic data relating to shareholders of securities;
    said processor configured to receive at a second time, second shareholder data consisting of historic data relating to securities and historic data relating to shareholders of securities;
    said processor configured to compare the first shareholder data received at the first time with the second shareholder data received at the second time to create comparison data;
    a storage device accessible by said processor, said storage device having stored thereon a set of marketing analysis data; and
    wherein said processor is configured to compare the comparison data against the set of marketing analysis data in order to automatically create a new securities marketing plan or evaluate an existing securities marketing plan.

2. The system of claim 1 wherein said processor is configured to automatically evaluate an existing securities marketing plan, and further comprising a storage device accessible by said processor, said storage device having stored thereon data indicative of the existing securities marketing plan.

3. The system of claim 2 wherein said processor is configured to automatically evaluate or aid performance of at least one party involved with the current marketing plan.

4. The system of claim 3 wherein the at least one party comprises at least one of an investment banker and an investor relations firm.

5. The system of claim 1 wherein the shareholder data comprises data indicative of a shareholder type, and wherein said processor is configured to automatically create a new marketing plan based at least in part on a distribution of share ownership among shareholder types.

6. The system of claim 1 wherein the first shareholder data and the second shareholder data comprises data indicative of shareholder geographic location, and wherein said processor is configured to automatically create a new marketing plan based at least in part on a geographic distribution of share ownership.

7. A system for automatically creating or evaluating a securities marketing plan, said system comprising:
    a processor having a communications connection configured to receive shareholder data concerning shareholders of securities periodically or from time to time, said shareholder data consisting of historic data relating to securities and historic data relating to shareholders of securities;
    a storage device accessible by said processor, said storage device having stored thereon a set of marketing analysis data; and
    wherein said processor is configured to compare shareholder data received at a first time with shareholder data received at a second time to create comparison data, and is configured to compare the comparison data against the set of marketing analysis data in order to automatically create a new securities marketing plan or evaluate an existing securities marketing plan.

8. A method for automatically creating or evaluating a securities marketing plan, the method comprising the steps of:
- receiving with a processor at a first time, first shareholder data concerning shareholders of securities via a communications connection, said first shareholder data consisting of historic data relating to securities and historic data relating to shareholders of securities;
- receiving with the processor at a second time, second shareholder data concerning shareholders of securities via a communications connection, the second shareholder data consisting of historic data relating to securities and historic data relating to shareholders of securities;
- comparing with the processor the first shareholder data received at the first time with the second shareholder data received at the second time to create comparison data;
- retrieving with the processor a set of marketing analysis data from a storage device; and
- comparing with the processor the comparison data against the set of marketing analysis data in order to create a new securities marketing plan or evaluate an existing securities marketing plan.

9. The method of claim 8 wherein the method automatically evaluates an existing securities marketing plan, and further comprising the step of retrieving data indicative of the existing securities marketing plan from a storage device.

10. The method of claim 9 wherein said step of comparing the comparison data against the set of marketing analysis data comprises the step of evaluating or aiding performance of at least one party involved with the current marketing plan.

11. The method of claim 10 wherein the at least one party comprises at least one of an investment banker and an investor relations firm.

12. The method of claim 8 wherein the first shareholder data and the second shareholder data comprises data indicative of a shareholder type, and wherein said step of comparing the comparison data against the set of marketing analysis data comprises the step of automatically creating a new marketing plan based at least in part on a distribution of share ownership among shareholder types.

13. The method of claim 8 wherein the first shareholder data and the second shareholder data comprises data indicative of shareholder geographic location, and wherein said step of comparing the comparison data against the set of marketing analysis data comprises the step of automatically creating a new marketing plan based at least in part on a geographic distribution of share ownership.

14. A method for automatically creating or evaluating a securities marketing plan, the method comprising the steps of:
- receiving with a processor, at a first time, first shareholder data concerning shareholders of securities via a communications connection, said first shareholder data consisting of historic data relating to securities and historic data relating to shareholders of securities;
- receiving with the processor, at a second time, second shareholder data concerning shareholders of securities via a communications connection, said second shareholder data consisting of historic data relating to securities and historic data relating to shareholders of securities;
- retrieving with the processor a set of marketing analysis data from a storage device;
- automatically comparing with the processor shareholder data received at the first time with shareholder data received at the second time to create comparison data; and
- automatically comparing with the processor the comparison data against the set of marketing analysis data in order to automatically create a new securities marketing plan or evaluate an existing securities marketing plan.

* * * * *